Figure 1:
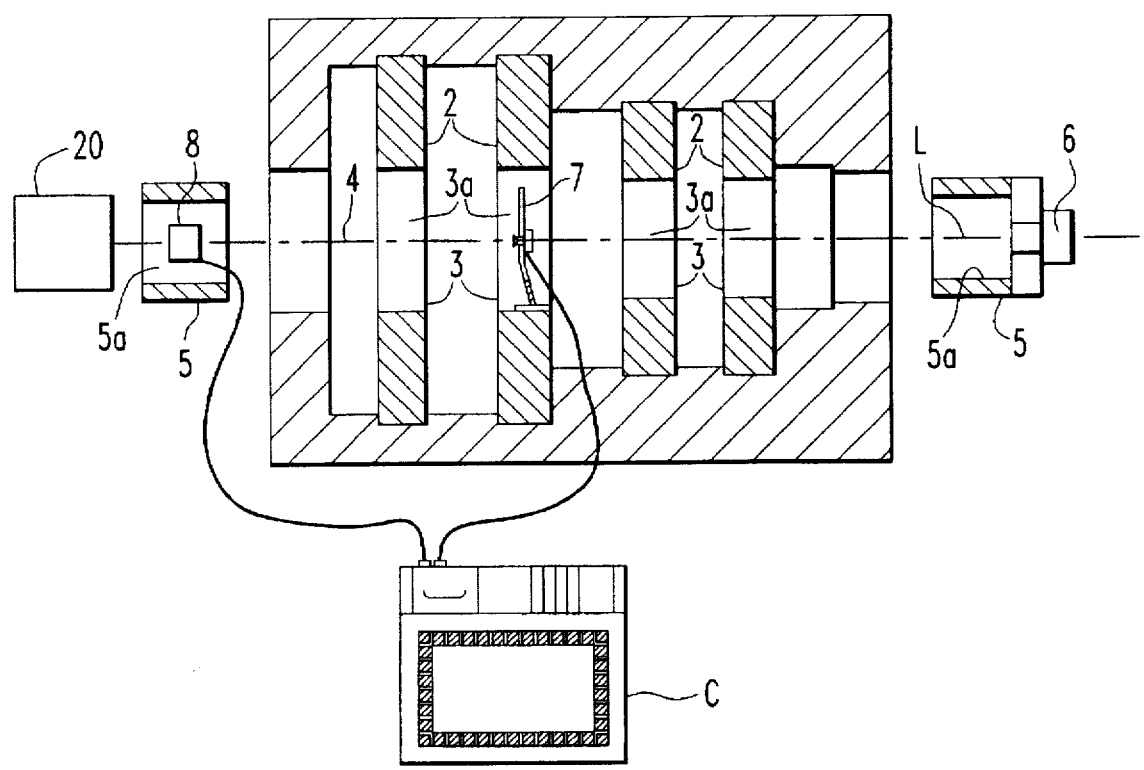

United States Patent [19]

Busch et al.

[11] Patent Number: 5,717,491
[45] Date of Patent: Feb. 10, 1998

[54] PROCESS AND DEVICE FOR DETERMINING THE CENTER-LINE OF A CURVATURE

[76] Inventors: Dieter Busch, Am Isarberg 1, W-8045 Ismaning; David Foley, Belgradstrasse 49, W-8000 München 40, both of Germany

[21] Appl. No.: 969,293
[22] PCT Filed: Jun. 5, 1992
[86] PCT No.: PCT/EP92/01269
§ 371 Date: Feb. 2, 1993
§ 102(e) Date: Feb. 2, 1993
[87] PCT Pub. No.: WO92/22784
PCT Pub. Date: Dec. 22, 1992

[30] Foreign Application Priority Data

Jun. 13, 1991 [DE] Germany .................. 41 19 445.4

[51] Int. Cl.⁶ .................................................. G01B 11/00
[52] U.S. Cl. .................. 356/400; 356/138; 356/139.1; 33/293; 250/559.37; 250/206.2
[58] Field of Search .................. 356/400, 152, 356/399–401, 138, 151, 153, 149, 139.07, 139.08, 139.1, 152.1, 141.1, 141.2, 376; 33/287, 286, 290–299; 250/559.22, 559.24, 559.3, 559.37, 559.38, 206.2

[56] References Cited

U.S. PATENT DOCUMENTS

| 3,723,013 | 3/1973 | Stirland et al. ............ 356/400 |
| 3,751,169 | 8/1973 | Fornerod ................... 356/152 |
| 3,940,858 | 3/1976 | Perrotti et al. ............ 33/293 X |
| 4,319,406 | 3/1982 | Pehrson, Sr. et al. ..... 33/286 X |
| 5,095,629 | 3/1992 | Klemer et al. ............ 356/399 |

Primary Examiner—K. Hantis
Attorney, Agent, or Firm—Kirkpatrick & Lockhart LLP

[57] ABSTRACT

Method and device for ascertaining the spacing of the center line of curvature of a concave body surface 3a and 5a, which is curved in the shape of a conical envelope, in particular the spacing of the longitudinal center line of a turbine rotor bearing or the central opening in the rim of a turbine impeller wheel from a reference axis. A sharply focussed light beam L, which presets the reference axis, is emitted by a light beam transmitter 6 through the measurement space which faces the body surface 3a and 5a to be measured. This light beam impinges on the measurement field of a photo-electronic position detector rigidly fastened at a sensing device 7. The sensing device 7 is supported in stable manner and displaceably on the body surface 3a and 5a to be measured and is rotated about the center line of curvature of the body surface through displacement of its supported end in the direction of curvature on the body surface. The position detector in that case supplies electrical signals which correspond to the instantaneous position of the point of incidence of the light beam on the measurement field. The signals are detected for at least three measurement points situated at an angular spacing and fed into a computer C, which on the basis of these signals as well as further data entered into it computes the spacing of the center line of curvature from the reference axis. Correction data for the production of the state of alignment of these body surfaces are derived from the spacings ascertained for several body surfaces 3a and 5a.

13 Claims, 2 Drawing Sheets

PROCESS AND DEVICE FOR DETERMINING THE CENTER-LINE OF A CURVATURE

The invention relates to a method for ascertaining the spacing between a center line of curvature of a concave body surface, which is curved in the shape of a conical envelope and faces a free measurement space and a references axis extending substantially parallel thereto, in terms of magnitude and direction. The invention also relates to a method performable with the use of this method for the mutual alignment of the bearing surfaces of a turbine rotor and the wall surfaces of the central openings in the impeller wheel rims of the turbine and to a spacer member with a biaxial photo-electronic position detector for the performance of these methods.

For example during the assembly of turbines, the rims of the turbine impeller wheels must before the fastening of the guide vanes at them be so aligned very accurately in respect of the longitudinal axis of the turbine or the rotational axis of the rotor that its longitudinal axis, i.e. the center line of curvature of the wall, which surrounds the central rim opening and is as a rule cylindrical, is in alignment therewith. The longitudinal axis of the turbine representing the reference axis is given by the cylindrical bearing surfaces of the turbine rotor, with the center lines of curvature of which it co-incides. The end bearing surfaces present in the stator of the turbine for the impeller wheel rims extend in planes which are perpendicular to the longitudinal axis of the turbine and the impeller wheel rims must during the assembly at the turbine stator be brought through displacement in radial direction along the bearing surfaces into the desired position of alignment of the center line of curvature of their central opening with the reference axis and then in this state be fixed in the stator. For the adjustment, aids are used which enable a defined displacement in radial direction along the stator bearing surface. During the assembly, one so proceeds that the respective impeller wheel rim is initially brought into an estimated position as closely as possible to the position of alignment to be achieved, then the spacing is ascertained, which the center line of curvature still displays from the reference axis, in magnitude and direction, then a correction is undertaken by means of the adjusting aids according to the measurement result and this operation is in a given case repeated until the spacing has become zero or no longer exceeds a tolerable minimum value.

The present invention permits the ascertaining of the spacing of the center line of curvature of a concave body surface, which is curved in the manner of a conical shell, from a reference axis preset by a light beam of small diameter, in particular by a laser beam.

In a known method of this kind (DE periodical; Feinwerktechnik & Messtechnik, 89th Year, Issue 6, Sep. 1981, page 262), the position detector is rotated about an axis which is substantially parallel to the center line of curvature of the body surface, for which it is borne to be rotatable in a tripod which is settable onto the body surface and remains standing stationarily thereon during the measurement. Rigidly connected with the position detector is an arm, which extends radially to the axis of rotation, with an electronic sensor which rotates with the position detector and in that case moves by its point along the body surface in the direction of curvature thereof. The sensor produces an electrical signal which represents the spacing of the sensor tip from the rotational axis in the tripod. The tripod is so dimensioned that the axis of rotation for the sensor and the position detector is situated near to the center line of curvature of the body surface which can for example be the internal surface of a tube. The pinching of the tube and the position of the tube can be deduced from the difference between the sensor signal and the position detector signal, which signals are continuously detected during the rotation. The rotatable bearing of the position detector and of the electronic sensor at the tripod cause mechanical tolerances which enter into the spacing measurement and falsify this. In addition, the device, which is needed for the performance of the known method and consists of the tripod and the unit, which is borne therein, of the position detector and the electronic sensor, is constructionally laborious and expensive. Moreover, in the known method, the position detector and the electronic sensor are rotated through a full angle of 360° in order to ascertain the tube position.

It is also known to preset the reference axis during the turbine assembly by means of a steel wire or the like, which stands under strong tension and was stretched between mountings, fitted into the bearing surfaces of the rotor bearings, exactly in alignment with their center line of curvature. The production of tensioning devices with centring surfaces fitting exactly to the rotor bearing surfaces and the exact central guiding equipment for the wire on their own already required an appreciable effort. In addition, the tensioned string presetting the reference axis in the usually given horizontal position of the longitudinal axis of the turbine inclines to a sagging which can falsify the measurement to an impermissible degree. Care must also be taken during the measurement that the tensioned string is not deflected laterally, which can even with strong tension already occur with a relatively slight pressure. The measurement and adjustment of the respective impeller wheel rim was Then so performed that, for points on the wall of the impeller wheel rim opening lying one behind the other at a spacing in the direction of curvature, their spacing from the tensioned string was ascertained with usual mechanical length-measuring devices and the position of the center line of curvature with respect to the reference axis, i.e. the tensioned string, was deduced from the measurement result, a corresponding positional correction of the impeller wheel rim with respect to the stator was thereafter performed with the adjusting aids and the operation repeated until a uniform spacing from the tensioned string resulted for the measurement points, whereupon the impeller wheel rim was finally fixed at the stator. This operation was very time-consuming and had to be performed, as already stated, with the observation of very great care.

According to the DE periodical Feingerätetechnik, 32 (1983) 5, pages 209 and 210, it is also known in alignment-measuring systems on laser bases to support a position detector rigidly on a substantially planar surface and to move it along the plane by the support so that the position detector follows unevennesses of the surface.

The invention is based on the task of creating a method that is performable very conveniently and rapidly with means, which are simple particularly in respect of their mechanical build-up, and delivers highly accurate results even when the position detector is rotated by its measuring surface over only a relatively small part of a complete revolution.

The preceding problem is solved by the method of the present invention. The use of an electronic computer to compute the spacing between the reference axis and the center line of curvature is a preferred refinement to the method of the present invention.

Due to the fact that the position detector of the present invention is rigidly fastened at the spacer member during the rotation and this is displaced along the body surface while being guided in stable manner, no kind of mechanical tolerances, which could falsify the measurement result, enter into the measurement. Beyond that, a rotation of the measurement field over only a part of a complete revolution suffices precisely to ascertain the spacing which the center line of curvature displays from the reference axis. The circumstance, that the spacer member for the attainment of such an only partial revolution of the measurement field need obviously be displaced likewise over only a partial region of the body surface in circumferential direction, facilitates the performance of the method appreciably in many cases.

The invention also permits the alignment of several body surfaces, which are arranged one behind the other, which method is capable of being brought about more rapidly than hitherto and with an optimum low labour effort for the achievement of the state of alignment of the body surfaces.

The present invention is based on the recognition that it does in practice not matter whether the state of alignment is achieved with respect to a reference axis fixed in the space from the start, but only that the center lines of curvature of the body surfaces are in alignment at all even when the final axis of alignment has a certain deviation relative to the originally preset reference axis so that the axis of alignment or the corresponding data for the correction displacements, which are to be undertaken at the individual bodies in connection therewith can be so computed that the state of alignment is achieved with a least possible total displacement of the associated bodies and thereby more rapidly and conveniently than hitherto.

A sensing device, and certain preferred embodiments suitable for performance of the method according to the invention are also subject of the invention.

The method according to the invention is suitable not only for the measurement of impeller wheel rims with a central cylindrical opening, but generally for ascertaining the spacing, which a concave surface curved in the manner of a conical envelope, for example a cylindrical or partly cylindrical surface as special shape of a cone or part cone with an apex angle of the value zero lying in infinity, displays from a reference axis.

Since a circular line, on which the points lying one behind the other in direction of curvature fall in the case of a conical envelope surface, is as known defined unambiguously by three points in a planar co-ordinate system, it suffices in principle, even when the radius of the circular line is not known, to detect the position signals of the position detector in the method according to the invention in only three angular position displaying a mutually angular spacing and to ascertain their position in space for only one of these angular positions in order to be able to compute the spacing of the center line of curvature from the reference axis in magnitude and direction. In this case, mathematical optimising methods can be resorted to. The accuracy can still be increased by the measurement of more than three points. A continuous tracing of the conical envelope surface in circumferential direction is also possible.

When the radius of the circular line, along which the measurement is undertaken, is known, the signal detection in two angular positions of the position detector suffices in principle for a known spatial orientation of one of these.

The invention is explained still more closely in the following by an example with reference to the drawing.

Figure 2:
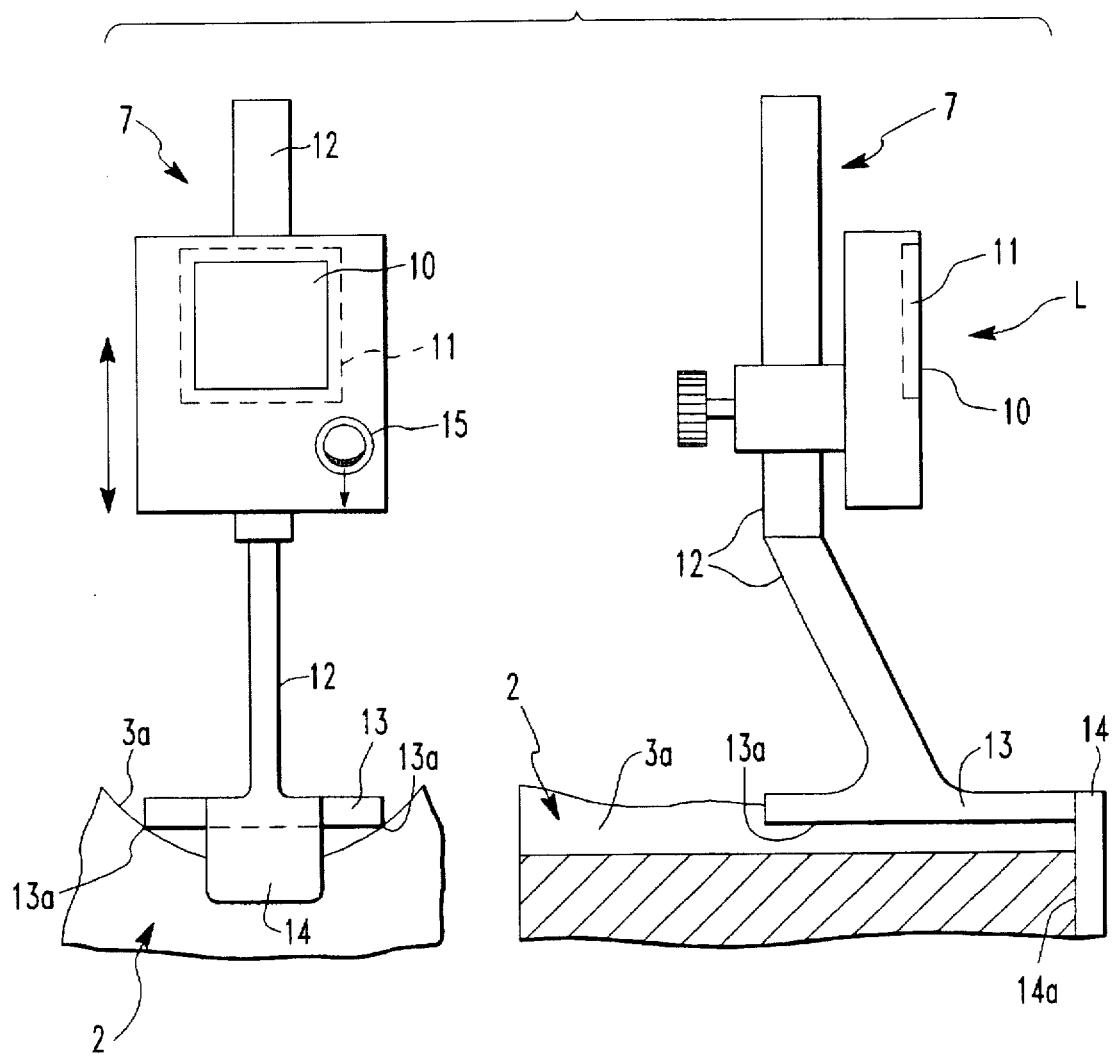

In the drawing, there show each time in schematic illustration:

FIG. 1 a turbine stator with impeller wheel rims and rotor bearings in axial longitudinal section, wherein also a sensing device with spacer member and position detector as well as a beam transmitter for the omission of a laser beam as reference axis for the spacing measurement according to the method according to the invention for the measurement of an impeller wheel rim and a computer fed with measurement data from the sensing device are also illustrated and FIG. 2 the sensing device, which is used for the performance of the method according to the invention for the assembly of the turbine in correct alignment according to FIG. 1, at the left in front elevation when viewed in the direction of the light beam and at the right in side elevation perpendicularly thereto.

The FIG. 1 shows in axial longitudinal section a turbine stator 1, in which impeller wheel rims 2 as well as turbine rotor bearings 5 at both sides are to be so adjusted that the center lines of the cylindrical wall surfaces 3a of the central openings 3 of the impeller wheel rims 2 and the center lines of curvature of the cylindrical bearing surfaces 5a of the turbine rotor bearings 5 are in alignment one with the other. A light beam transmitter 6 is mounted at the rotor bearing 5 to be seen at the right in FIG. 1 and emits a sharply focussed light beam L of small divergence, preferably a laser beam, through the measurement space, which is enclosed by the opening wall surfaces 3a of the impeller wheel rims 2, approximately parallelly to the final, still accurately to be oriented rotational rotor axis 4 and closely thereto. As illustrated for the second impeller wheel rim 2 from the left in FIG. 1, the light beam L, which presets a reference axis for the measurement, during the individual measurement of the cylindrical body surfaces 3a impinges on a sensing device 7, which is supported in this impeller wheel rim 2 at the wall surface 3a thereof in a manner still to be explained more closely further below and is displaceable along this. The sensing device 7 produces electrical signals which characterise the position of the point of incidence of the light beam on it and supplies these to a computer C, which from these signals and from the angular position, which the sensing device 7 assumes on the arising thereof and is ascertained separately for at least one such signal and likewise entered into it as electrical signal (angle signal), under program control computes the spacing of the center line of curvature of the opening wall surface 3a of this impeller wheel rim 2 from the reference line 4. The computer C receives the spacing signals in a given case together with further electrical signals from the sensing device 7.

The sensing device 7 is according to FIG. 2 provided with a photoelectronic position detector 11, which displays a biaxial measurement field 10 and is fastened at a rigid spacer member 12, here adjustably, at a known spacing from one end from this in such a manner that the light beam L impinges on the measurement field 10. At the aforementioned end, the spacer member 12 is provided with means 13 for the stable slidable support against the wall surface 3a of the central impeller wheel opening 3, for which it is retained by these means 13 as well as by further means 14 in such a position with respect to the wall surface 3a that the measurement field 10 of the position detector 11 is oriented perpendicularly to the center line of curvature of this wall surface 3a. The means 13, as illustrated, have sliding surfaces 13a, which are settable onto the surface 3a at a spacing in circumferential direction, are parallel thereto and extend over a certain length in its axial direction, and the means 14 display a further sliding surface 14a, which is supportable in stable manner at the end face of the body or impeller wheel rim 2 and is guided by this, since this end face in the example of embodiment extends parallelly to the direction of curvature of the body surface 3a. This last-mentioned sliding surface can also be magnetic in order that it is drawn against the end face guide surface at the body 2 and automatically remains in contact with this when the body 2 consists of ferromagnetic material.

The sensing device 7 is furthermore provided with an angle-measuring device 15, here in the form of a plumb bob, which ascertains the instantaneous angular position of the measurement field 10 with respect to the vertical, thus its angular position with respect to a space-bound co-ordinate system, and likewise supplies corresponding electrical signals to the computer C.

The spacer member 12 can also be of variable length. In this case, the position detector 11 could also be fastened immovably at the spacer member 12.

The measurement data are preferably transmitted by radio from the sensing device 7 to the computer C, for which the sensing device 7 is equipped with a transmitter and the computer C with a receiver (not illustrated).

The spacing signals, which arise in the course of the measurement of an impeller wheel rim 2 or also during the measurement of several impeller wheel rims, and other data are preferably stored intermediately in a not illustrated storage device equipment in the sensing device and transmitted collected together after completion of the measurement.

The position detector 11 supplies electrical position signals to the computer C, which correspond to the position of the point of incidence of the light beam on the measurement field 10. When the supported end of the spacer member 12 is displaced in the direction of the curvature of the wall surface 3a in contact therewith, the measurement field 10 during the redisposition of the support of the spacer member 12 rotates constrainedly about the center line of curvature of the wall surface 3a and the point of incidence of the light beam describes a circle or circular arc around this on the measurement surface 10. When position signals supplied by the position detector 11 in at least three different angular positions of the measurement field 10 are detected together with an angle signal for one of these position signals and are entered into the computer C, this has received sufficient data in order to be able to compute the spacing of the reference axis or of the light beam L from the center line of curvature, since a circle is determined unambiguously by three points lying on it. When moreover for one of these points the angular position of the measurement field during its detection is also still known, the spatial direction of the spacing can also be stated. In principle, three measurement points in conjunction with the known spatial angular position of the measurement field suffice for one of these for the unambiguous computation of the spacing of the center line of curvature from the reference axis in magnitude and direction. The more measurement points of all deviations of individual measurement points the computation result commends, the more accurate becomes the ascertainment of the spacing. Preferably, mathematical optimising methods are drawn upon for the computation.

With the scanning device 7 according to FIG. 2 in conjunction with the light beam L emitted by the light beam transmitter 6 in FIG. 1, the aforedescribed inventive method of the spacing determination can evidently be performed rapidly, precisely and effortlessly for each of the surfaces 3a curved cylindrically or in the shape of a conical envelope and also for the bearing surfaces 5a, for which only a relatively small angular region of the respective surface need in principle be traced with measurement value pick-up at a few measurement points.

When these spacings have once been ascertained in magnitude and direction, corrective measures can also be computed in terms of value and performed, which are in a given case required for the elimination of these spacings. In this case, one preferably proceeds in such a manner that the reference axis is not preset from the start as axis of alignment, but the computation of the correction data aims at an axis of alignment, which can be reached with a smallest possible total displacement of all body surfaces to be aligned. This axis of alignment will however lie closely to the reference axis, since the body surfaces before the measurement by the method according to the invention are already aligned to a large extent for reasons of construction and the corrections still to be undertaken lie in the range of millimeters or less.

It can happen that the concave body surface 3a and 5a, which is to be measured, departs somewhat from the exact shape of a conical envelope or a part of such. The method according to the invention enables also such deviations to be ascertained with the aid of the computer and the sensing device 7 by means of an appropriate computer program In this case, not only at least three, but at least five electrical signals supplied by the position detector in different angular positions must be detected and entered into the computer C. In a given case, the space-related angular position, which is given for more than one of these signals during its formation, of the measurement field 10 must be ascertained and communicated to the computer C.

In one preferred embodiment of the invention, the spacer member 12 and the photo-electronic position detector 11 are transparent, at least in the region of the measurement field 10 as shown by the light beam passing therethrough. Moreover, a piece of equipment 20 is arranged in a fixed location for monitoring the position of the light beam.

I claim:

1. Method for ascertaining a spacing between a center line of curvature of a concave body surface which is curved in the shape of a conical envelope and faces a free measurement space and a references axis extending substantially parallel thereto, in terms of magnitude and direction, comprising the steps of:

a) projecting a light beam of small diameter in the measurement space along said references axis, b) bringing a biaxial photo-electronic position detector, which has a measurement field, into a measurement position by means of a spacer member, which is supported in stable manner at the concave body surface whereby said measurement field extends in a measurement plane which is substantially perpendicular to the center line of curvature of the concave body surface and the light beam is incident on the measurement field, c) rotating the biaxial position detector in the measurement position about an axis which is substantially parallel to the center line of curvature of the concave body surface, d) constraining the rotation of the biaxial photo-electronic position detector about the center line of curvature of the concave body surface, e) detecting electrical position signals, which are supplied by the position detector and characteristic of the associated position of the point of incidence of the light beam on the measurement field for at least three different, mutually spaced rotary settings of the measurement field, f) ascertaining the angular position of the measurement field in a space-bound co-ordinate system for at least one of the rotary settings of the measurement field for which a position signal is detected, and g) computing the spacing between the reference axis and the center line of curvature in terms of its magnitude and its direction with respect to the space-bound co-ordinate system from the position signals and the ascertained angular position in the space-bound co-ordinate system on the basis that the point of incidence of the light beam describes a circular line, which is substantially concentric with the center line of curvature of the concave body surface on the measurement field during the rotation of the biaxial position detector.

2. Method according to claim 1, characterized thereby, that the step (g) of computing the spacing is performed by means of an electronic computer.

3. Method according to claim 1, characterised thereby, that the position signals are stored intermediately.

4. Method for aligning a plurality of bearing surfaces of a turbine rotor, said turbine rotor having plurality of impeller wheel rims, each wheel rim having a central opening, each central opening having a wall surface, and the wall surfaces of the central openings in the impeller wheel rims of the turbine rotor, in such a manner that the center line of curvature of each wall surface is aligned with the center line of curvature of each bearing surface with the use of the method according to claim 1, characterized thereby, that for each wall surface and each bearing surface the spacing of its center line of curvature from a references axis, which is represented in commo for all of said surfaces, is ascertained in terms of magnitude and direction, a spatial position of an alignment axis, which is common to all of said surfaces and into which each of said surfaces can be set by their center line of curvature with least possible total displacement of all of said surfaces, additionally comprising the steps of computing from the computed spacings for each of said surfaces how far and in which direction each of said surfaces must be displaced in space to set its center line of curvature into line with the alignment axis.

5. Sensing device with a rigid spacer member, which comprises means for stable support against a concave body surface which is curved in conical shape, and a photo-electronic position detector, which is mounted at the spacer member and has a biaxial measurement field for the reception of a light beam of small diameter and for the supply of electrical position signals characterizing the position of the point of incidence of the light beam on the measurement field, characterized thereby, that the position detector is rigidly fastened at the spacer member and an equipment for the constrained guidance in the direction of curvature of the body surface during displacement along the body surface.

6. Sensing device according to claim 5, characterized thereby, that the position detector is displaceable along the spacer member.

7. Sensing device according to claim 5, characterized thereby, that the length of the spacer member is variable.

8. Sensing device according to claim 5, characterized thereby, that the unit of the spacer member and the position detector is provided with a protractor for ascertaining the angular position of the measurement field of the position detector in a space-bound co-ordinate system.

9. Sensing device according to claim 5, characterized by an equipment for the wireless remote transmission of the position signals to a receiver of fixed location.

10. Sensing device according to claim 5, characterised by a program-controlled electronic operator control.

11. Sensing device according to claim 5, characterized thereby, that the spacer member and the photo-electronic position detector are transparent at least in the region of the measurement field and, behind them in the direction of the light beam, an equipment is arranged in fixed location for monitoring the position of the light beam.

12. Sensing device according to claim 5, characterized by the equipment for the constrained guidance in the direction of the curvature of the body surface during the displacement along this also constrains alignment of the spacer member in such a manner that the measurement field of the position detector fastened thereat is perpendicular to the center line of curvature of the body surface.

13. Sensing device according to claim 5, characterized thereby, that the spacer member is provided with at least one adhesion magnet at a sliding surface which holds the spacer member during the displacement along the body surface in contact with the concave body surface.

* * * * *